(12) United States Patent
Orji et al.

(10) Patent No.: US 10,962,670 B2
(45) Date of Patent: Mar. 30, 2021

(54) FAR FIELD SIGNATURE DETERMINATION

(71) Applicant: PGS Geophysical AS, Oslo (NO)

(72) Inventors: Okwudili Orji, Oslo (NO); Endrias Asgedom, Oslo (NO); Daniel Martin Lewis Barker, Oslo (NO); Walter F. Söllner, Oslo (NO)

(73) Assignee: PGS GEOPHYSICAL AS, Oslo (NO)

( * ) Notice: Subject to any disclaimer, the term of this patent is extended or adjusted under 35 U.S.C. 154(b) by 424 days.

(21) Appl. No.: 15/959,364

(22) Filed: Apr. 23, 2018

(65) Prior Publication Data

US 2018/0321410 A1 Nov. 8, 2018

Related U.S. Application Data

(60) Provisional application No. 62/501,170, filed on May 4, 2017.

(51) Int. Cl.
*G01V 1/00* (2006.01)
*G01V 1/38* (2006.01)

(52) U.S. Cl.
CPC .... *G01V 1/3861* (2013.01); *G01V 2210/1423* (2013.01); *G01V 2210/56* (2013.01)

(58) Field of Classification Search
CPC .................................................. G01V 1/3861
USPC ......................................................... 702/16
See application file for complete search history.

(56) References Cited

U.S. PATENT DOCUMENTS

| 4,476,553 A | 10/1984 | Ziolkowski |
| 4,868,794 A | 9/1989 | Ziolkowski |
| 9,594,180 B2 * | 3/2017 | Synnevaag ............ G01V 1/364 |
| 2007/0258322 A1 * | 11/2007 | Hopperstad ............. G01V 1/38 367/23 |
| 2013/0322208 A1 * | 12/2013 | Sollner ................ G01V 1/3808 367/24 |

OTHER PUBLICATIONS

Asgedom, et al., "Rough Sea Surface Implications on Receivers Deghosting"; Technical Article; First Break, vol. 35, Apr. 2017 (9 pgs).
Orji, et al., "Effects of Time-Varying Sea Surface in Marine Seismic Data"; Geophysics,vol. 77, No. 3, (May-Jun. 2012) (pp. 33-43) (13 figs) (11 pgs).
Thorsos, et al., "The Validity of the Kirchhoff Approximation for Rough Surface Scatterin Using a Gaussian Roughness Spectrum"; J. Acoust. Soc. Am, vol. 83, No. 1 (Sep. 15, 1987) (15 pgs).

(Continued)

*Primary Examiner* — Aditya S Bhat

(57) ABSTRACT

Determining a far field signature of a source array can include receiving data associated with a sea surface state and determining a coherent portion and an incoherent portion of a reflection coefficient of the sea surface based on the received data. A notional source signature of each source of the source array can be determined based on the coherent portion, the incoherent portion, and near field data associated with each of the sources, and the far field signature of the source array can be determined based on the notional source signatures of each of the sources. The notional source signature and the far field signature can be stored. A seismic image of a subsurface location can be generated based on the determined far field signature.

28 Claims, 6 Drawing Sheets

(56) References Cited

OTHER PUBLICATIONS

Ziolkowski, et al., "The Signature of an Air Gun Array: Computation from Near-Filed Measurements including Interactions"; Geophysics, vol. 47, No. 10 (Oct. 1982) (pp. 1413-1421) (9 Figs) (9 pgs).

Ishimaru, et al., "Wave Propagation and Scattering in Random Media and Rough Surfaces"; Proceedings of the IEEE, vol. 79, No. 10 (Oct. 1991) (8 pgs).

* cited by examiner

FAR FIELD SIGNATURE DETERMINATION

CROSS-REFERENCE TO RELATED APPLICATIONS

This application claims priority to U.S. Provisional Application 62/501,170, filed May 4, 2017, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more marine survey sources (hereinafter referred to as "sources") below the sea surface and over a subterranean formation to be surveyed for mineral deposits. Marine survey receivers (hereinafter referred to as "receivers") may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be impulsive sources such as air guns, non-impulsive sources such as marine vibrator sources, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The receivers thereby measure a wavefield that was initiated by the actuation of the source.

DETAILED DESCRIPTION

Figure 1:
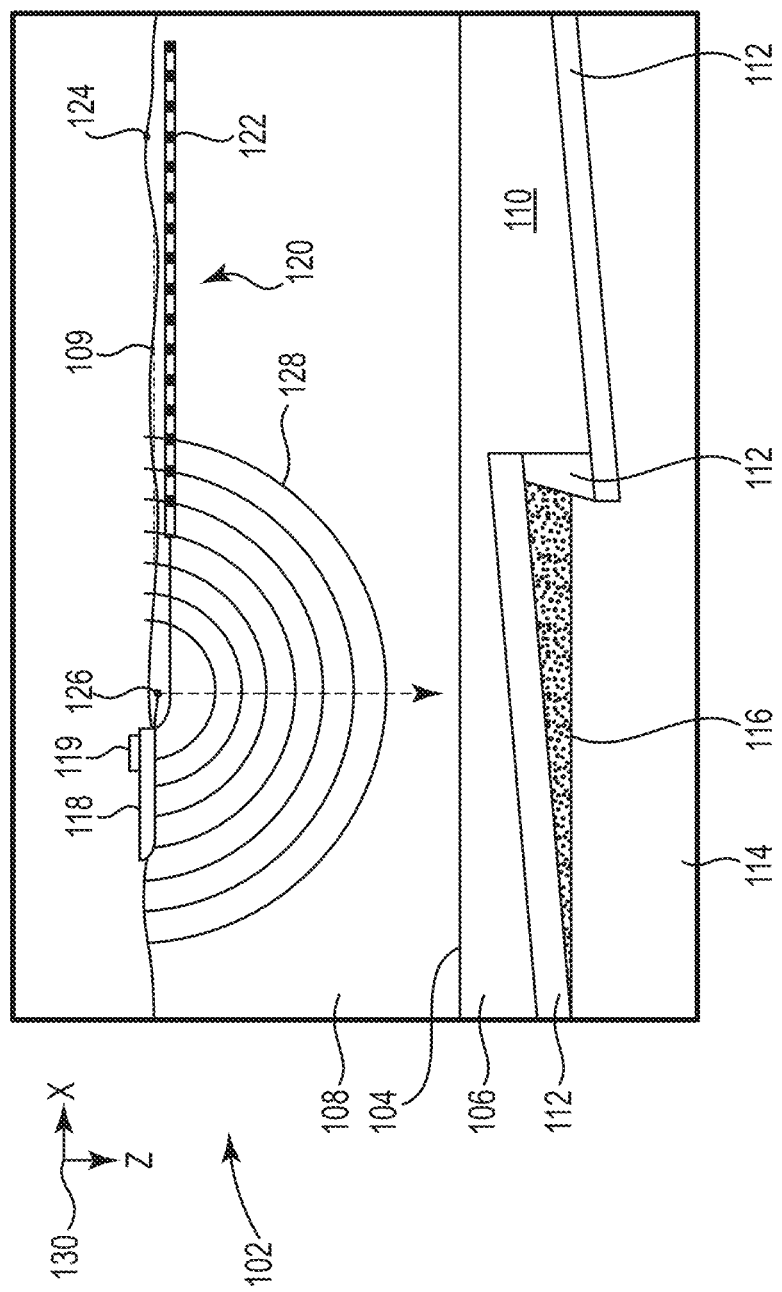
FIG. 1 illustrates an elevation or xz-plane view of marine surveying in which signals are emitted by a source for recording by receivers.

The present disclosure is related to determining a far field signature of a marine seismic source array or sub-array. A marine seismic source is a device that generates controlled acoustic energy used to perform marine surveys based on reflection and/or refraction of the acoustic energy. Marine seismic sources can be marine impulsive sources or marine non-impulsive sources. Examples of marine impulsive sources include air guns, explosive sources (e.g., dynamite), plasma sound sources, boomer sources, etc. An example of marine non-impulsive source is a marine vibrator. A marine seismic source array is an array of marine seismic sources towed together by a marine survey vessel and actuated separately. A marine seismic source sub-array is an array of marine seismic sources towed together by a marine survey vessel and actuated together or separately. A marine seismic source sub-array may be part of a marine seismic source array.

One characteristic of a seismic source is its far field signature. A signature of a seismic source refers to a shape of the signal transmitted by the seismic source as recorded by a seismic receiver. The signal shape characterizes the source. In time domain, the shape of the signal shows what the source emits as time varies. In frequency domain, the individual amplitude for each frequency can be observed. The shape of the signal varies from source-to-source. The signature of the seismic source varies with direction and with distance from the seismic source. Along a given direction, this signature varies with increasing distance from the seismic source, until at some given distance the shape of the signature achieves a relatively stable shape. At greater distances than this given distance, the signature remains relatively unchanged. The region where the signature shape does not change substantially with distance in a given direction is known as the far field region and the seismic signature measured or estimated within that region is known as the far field signature of the seismic source. Often the far field region will be greater than 100 meters from the source, and 200 meters from the source will be in the far field region in most instances. The far field signature of a source array having more than one source separated in space varies with direction. For instance, in comparison to a first far field signature measured vertically (e.g., in-line with gravitational pull) under the geometric center of the source array, a second far field signature can vary notably when measured at a 30-degree angle (30°) offset from vertical under the center of the seismic source. The center of the seismic source can be calculated as a geometric center reference point determined from the outermost edges of the most distal sources in one, two, or three dimensions, depending on the configuration of the source array.

By way of example, "near field" includes measurements taken a distance from the seismic source that is less than about a wavelength of the acoustic signal from the seismic source, "intermediate field" includes measurements taken a distance from the seismic source approximately equal to, or on the same order of magnitude as, the wavelength, and "far field" includes measurements taken a distance from the seismic source much greater than the wavelength. Put another way, far field includes a region where a shape of a signal does not change with the distance. For instance, in the far field, both an amplitude and phase spectra remain the same in a given direction.

An accurate far field signature determination can result in optimized notional source signature computation and improved source deghosting and source designaturing. In addition, an accurate far field signature determination can result in higher fidelity data and reduced imaging error. In at least one embodiment of the present disclosure, far field signatures can be determined on an actuation-by-actuation basis, which can improve image processing. For instance, seismic models better indicative of a subterranean formation, as compared to originally collected seismic data can be generated. For instance, such a model can be better indicative of the subterranean formation as compared to the original seismic data in that hydrocarbon or other mineral information can be determined based on the better indicative model.

As used herein, a notional source signature is a near field signature with sounds of neighboring sources removed. For instance, in an example seismic source array including two or more seismic sources, each seismic source can be represented by a notional source signature. In an example seismic source array of two impulsive sources, pressure variations caused by the second impulsive source can be absorbed into the notional source signature of the first impulsive source, and vice versa. In such an example, the two impulsive sources are represented as two independent impulsive sources having their respective notional source signatures.

Prior approaches to far field signature determination include computing far field signatures at a particular location by summing notional source signatures at this particular location. A particular location is a desired, predetermined, or threshold distance from a source or source array. The notional source signatures are computed assuming a constant reflection coefficient of a sea surface, which may be a particular value (e.g. 0.8, 1, −0.8, −1, etc.), for all angles and frequencies, and may not be angle- or frequency-dependent because it is constant.

A reflection coefficient can represent a contribution of a sea surface state. For instance, the contribution includes how much of a wavefield or signal may be reflected back from a sea surface to contribute to a particular source. For instance, a reflection of a wavefield or its ghost may be reflected from the sea surface in addition to the wavefield. In such an example, a flat sea surface has a reflection coefficient of 1 since its surface is smooth. This can be referred to as a constant reflection coefficient. With respect to the particular source contribution, a wavefield is generated by a source reflected at the sea surface as a ghost. Both the wavefield and its ghost from the sea surface become the source that illuminate the subsurface.

As noted, a constant reflection coefficient assumes a flat, mirror-like sea surface state. A constant reflection coefficient has been used in prior approaches, at least in part because methods for accurately determining or estimating the sea surface state has not been achievable until recently. Such prior approaches may not accurately determine a far field signature when a sea surface state is not smooth, but is wavy or rough, for instance. A sea surface state, as used herein, includes conditions occurring at a sea surface including, for instance, wave height, time-derivative changes in wave height, and wave frequency, among others.

In contrast, at least one embodiment of the present disclosure includes determining an improved far field signature by determining a notional source signature using near field data and taking into account a sea surface state of a sea surface that may not be smooth. Near field data, as used herein, is data collected within a near field region using near field measurements. For example, at least one embodiment of the present disclosure includes determining statistically accurate far field signatures by taking into account near field data and coherent and incoherent portions of a reflection coefficient, including for angle- and frequency-dependent reflection coefficients. Statistically accurate far field signatures include determined far field signatures that are not significantly statistically different than what a measurement would be of the far field signatures. Improved far field signature determinations can result in improved source deghosting and source designaturing. In at least one embodiment, accuracy of far field signature determinations as compared to prior approaches can increase as a sea surface state gets rougher. For instance, at least one embodiment of the present disclosure takes into account a sea surface state and its reflection coefficient when determining a far field signature, in contrast to prior approaches that use a constant value for a reflection coefficient regardless of the sea surface state.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 118 may reference element "18" in FIG. 1, and a similar element may be referenced as 218 in FIG. 2. Analogous elements within a Figure may be referenced with a hyphen and extra numeral or letter. See, for example, elements 222-1, . . . , 222-4 in FIG. 2. Such analogous elements may be generally referenced without the hyphen and extra numeral or letter. For example, elements 222-1, . . . , 222-4 may be collectively referenced as 222. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an elevation or xz-plane 130 view of marine surveying in which signals are emitted by a source 126 for recording by receivers 122. The recording can be used for processing and analysis in order to help characterize the structures and distributions of features and materials underlying the surface of the earth. For example, the recording can be used to estimate a physical property of a subsurface location, such as the presence of a reservoir that may contain hydrocarbons. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, second, underlying rock layer 114, and hydrocarbon-saturated layer 116. One or more elements of the subsurface volume 106, such as the first sediment layer 110 and the first uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which receivers may be coupled. In one type of marine survey, each receiver, such as the receiver 122 represented by the shaded disk in FIG. 1, comprises a pair of sensors including a geophone that detects particle motion displacement within the water by detecting particle motion variation, such as velocities or accelerations, and/or a receiver that detects variations in pressure. In one type of marine survey, each receiver, such as receiver 122, comprises an electromagnetic receiver that detects electromagnetic energy within the water. The streamers 120 and the marine survey vessel 118 can include sensing electronics and data-processing facilities that allow receiver readings to be correlated with absolute positions on the sea surface and absolute three-dimensional positions with respect to a three-dimensional coordinate system. In FIG. 1, the receivers along the streamers are shown to lie below the sea surface 109, with the receiver positions correlated with overlying surface positions, such as a surface position 124 correlated with the position of receiver 122. The marine survey vessel 118 can include a controller 119, which is described in more detail with respect to FIG. 3. For example, the controller 119 can be coupled to the source 126 and configured to control the source 126 by application of an optimized sweep signal as described herein.

The marine survey vessel 118 can tow one or more sources 126 that produce signals as the marine survey vessel 118 and streamers 120 move across the sea surface 109. Although not specifically illustrated, the sources 126 can include at least one marine impulsive source and at least one marine non-impulsive source. Sources 126 and/or streamers 120 may also be towed by other vessels or may be otherwise disposed in fluid volume 108. For example, receivers may be located on ocean bottom cables or nodes fixed at or near the surface 104, and sources 126 may also be disposed in a nearly-fixed or fixed configuration. For the sake of efficiency, illustrations and descriptions herein show receivers located on streamers, but it should be understood that references to receivers located on a "streamer" or "cable" should be read to refer equally to receivers located on a towed streamer, an ocean bottom receiver cable, and/or an array of nodes.

FIG. 1 shows acoustic energy illustrated as an expanding, spherical signal, illustrated as semicircles of increasing radius centered at the source 126, representing a down-going wavefield 128, following a signal emitted by the source 126. For ease of illustration and consideration with respect to the detail shown in FIG. 1, the down-going wavefield 128 may be considered as a combined output of both a marine impulsive source and a marine non-impulsive source. The down-going wavefield 128 is, in effect, shown in a vertical plane cross section in FIG. 1. The outward and downward expanding down-going wavefield 128 may eventually reach the surface 104, at which point the outward and downward expanding down-going wavefield 128 may partially scatter, may partially reflect back toward the streamers 120, and may partially refract downward into the subsurface volume 106, becoming elastic signals within the subsurface volume 106.

Figure 2:
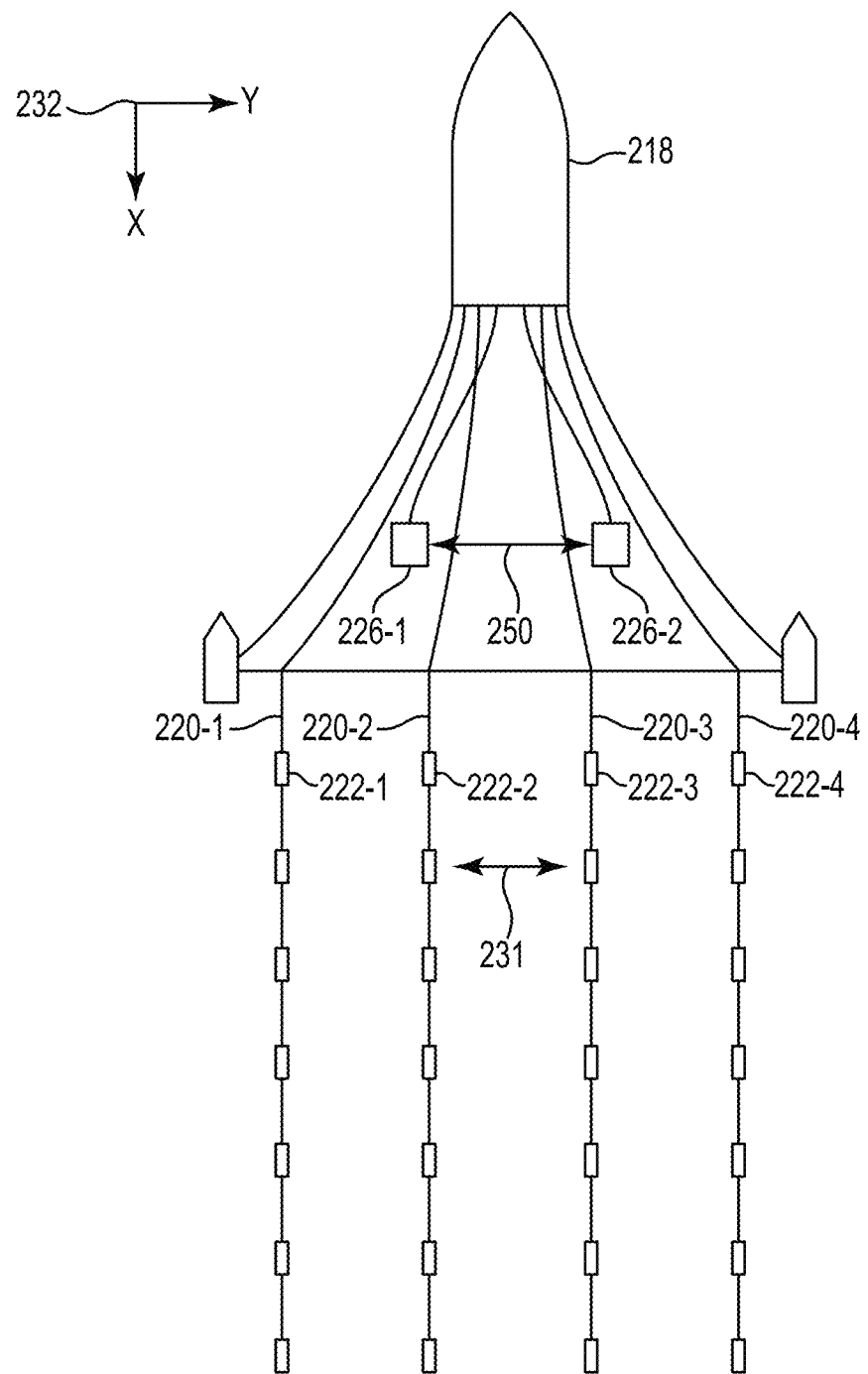
FIG. 2 illustrates a plane (yx-plane) view of marine seismic surveying with two seismic sources positioned outside the innermost two streamers.

FIG. 2 illustrates a plane (yx-plane 232) view of marine seismic surveying with two seismic sources 226-1 and 226-2. FIG. 2 shows an example of a marine survey vessel 218, which can be analogous to the marine seismic survey vessel 118 illustrated in FIG. 1, equipped to carry out marine seismic surveys. The marine seismic vessel 218 can tow one or more streamers, such as the streamers 220-1, 220-2, 220-3, and 220-4, which can be analogous to the streamer 120 illustrated in FIG. 1. The streamers 220 can include one or more receivers (represented by the small rectangles), such as the receivers 222-1, 222-2, 222-3, and 222-4, which can be analogous to the receivers 122 illustrated in FIG. 1. The marine seismic survey vessel 218 can tow one or more seismic sources, such as the seismic sources 226, which can be analogous to the seismic sources 126 illustrated in FIG. 1. The recorded data can be three-dimensional in that it includes data from wavefields traveling in both an inline (x) direction and a cross-line (y) direction, plus depth. Although FIG. 2 illustrates two seismic sources 226, four streamers 220, and thirty-two receivers 222, embodiments are not so limited.

The marine survey vessel 218 can include a control system and a recording system, which may be separate systems that communicate data between each other, or they may be sub-systems of an integrated system. The control system can be configured to selectively actuate the seismic sources 226, while the recording system can be configured to record the signals generated by the receivers 222 in response to the energy imparted into the water and thereby into subterranean material formations below the solid surface. The recording system can be configured to determine and record the geodetic positions of the seismic sources and the receivers 222 at any time. Seismic source actuation and signal recording by the receivers 222 may be repeated a plurality of times while the marine survey vessel 218 moves through the water. Each actuation record may include, for each of the receivers 222, signals corresponding to the energy produced by the seismic sources 226.

The cross-line streamer separation 231 illustrates the spacing of the streamer 220-2 from the streamer 220-3. The cross-line direction is in the y-direction illustrated in FIG. 2. Although only indicated for the streamers 220-2 and 220-3, the streamer 220-1 can be spaced apart from the streamer 220-2 by the cross-line streamer separation 231 and the streamer 220-3 can be spaced apart from the streamer 220-4 by the cross-line streamer separation 231. The cross-line streamer separation 231 can be a nominal cross-line streamer separation. As used herein, a "nominal cross-line streamer separation" refers to the cross-line distance between the front ends of adjacent streamers. The cross-line streamer separation 231 can be an average cross-line streamer separation. When the streamers 220 are irregularly spaced apart from one another, the cross-line separation 231 can be the average of the cross-line separation between each of the streamers 220. For example, the cross-line streamer separation 231 can be the average of the spacing of the streamer 220-1 from the streamer 220-2, the spacing of the streamer 220-2 from the streamer 220-3, and the spacing of the streamer 220-3 from the streamer 220-4. In at least one embodiment, the streamers 220 can be towed in a curved path.

As illustrated in FIG. 2, the seismic source 226-1 is spaced apart from the seismic source 226-2 by a cross-line source separation 250. For the sake of efficiency, illustrations and descriptions herein include individual seismic sources. However, in at least one embodiment the cross-line source separation 250 can be the distance between adjacent seismic source sub-arrays. For example, a first seismic source sub-array can be positioned where the seismic source 226-1 is positioned in FIG. 2 and a second seismic source sub-array can be positioned where the seismic source 226-2.

As used herein, "offset" refers to the distance between a seismic source and any receiver on a streamer. "Near offset" for a particular streamer refers to the distance between a seismic source and the receiver that is most closely located to the seismic source. For example, the first near offset receiver is the first receiver between the source and the streamer closest to the source. In at least one embodiment, during processing, only marine seismic survey data from the receivers having short near offsets contributes to the generation of the subsurface image. In at least one embodiment, near field data is collected at short near offset distances. When a seismic source and a receiver are located closely together, the ray path from the seismic source to the subsurface and back up to the receiver is generally vertical. In contrast, the ray path through the subsurface is generally at a high angle when the offset is long. The physics of elastic solids is such that the amplitude of a reflected wavefield varies with the offset for reflections off of the same interface, even when the material properties on either side of the interface are the same at each reflection. Reflection data from reflections at near offsets can be used to infer properties and the composition of the subsurface, and to examine the reflection amplitudes at other offsets. Reflection data at near offset, such as amplitude, can be used in Amplitude versus Offset (AVO) analysis to infer the composition of the subsurface. In processing of reflection data for shallow geology, only the reflection data corresponding to shorter offsets might be used. Thus, if the near offsets are large such that the streamers are a long distance behind the seismic sources or some of the streamers are far from the seismic sources in the cross-line direction then there may not be reflection data that contributes to the shallow seismic image.

In at least one embodiment of the present disclosure, determining a far field signature of a source array can include accounting for coherent and incoherent portions of an angle- and frequency-dependent reflection coefficient. As used herein, a coherent portion of a reflection coefficient is a portion of the reflection coefficient that is associated with a specular reflection. The incoherent portion of the reflection coefficient includes a portion of the reflection coefficient that is associated with a non-specular reflection. For instance, a smooth or "plane" sea surface reflects a wavefield or signal that contacts its surface (specular reflection) and can have a reflection coefficient of −1, which is coherent. If the sea surface is rough, the wavefield or signal may be scattered. If the roughness of the sea surface is not severe, most of the wavefield and/or signal follows a specular direction (coherent), while parts of it are scattered in other directions (incoherent). For example, when a source is actuated, and a wavefield is sent to a smooth sea surface, the wavefield will reflect at the same angle at which it was sent (e.g., angle of incidence). For instance, if the wavefield is actuated at a 30-degree angle of incidence from a source, it may be received at a 30-degree angle at a receiver, which may be referred to as a specular reflection. Such an example obeys Snell's Law and makes up a coherent portion of a reflection coefficient. In contrast, if the sea surface is not smooth, and the source is actuated and the same 30-degree angle and a same frequency, a portion of the wavefield may be received at a 30-degree angle at the receiver, but other portions of the wavefield may be received at different angles at the receiver, which may be referred to as a non-specular reflection. These other portions make up the incoherent portion of the reflection coefficient. In at least one embodiment, these other portions do not follow the angle of incidence that was used during actuation of the source, for instance, they may be greater than the angle of incidence, less than the angle of incidence, or a combination thereof.

Put another way, if the sea surface is rough, reflected wavefields can be in an irregular, incoherent, or random pattern in relation to the wavefield resulting from the source actuated at an angle of incidence (also referred to as the incident wavefield). The incident wavefield can follow Snell's Law, meaning the angle of reflection of the wavefields reflecting from the sea surface can be the same or approximately the same as the angle of incidence. As used herein, "approximately" can include a value within a particular margin, range, and/or threshold. Coherent and incoherent portions of the reflection coefficient can be angle- and frequency-dependent, meaning both portions can change based on angles of incidence, reflection angles, and frequencies of source signals, and as a result, the reflection coefficient as a whole can change, and may not be constant.

In at least one embodiment, sea surface state data can be used to determine coherent and incoherent portions of the reflection coefficient, and statistically accurate notional source signatures can be determined. As used herein, sea surface state data is information about an actual sea surface state or statistical data associated with the sea surface state. As used herein, an actual sea surface state is a measured condition of the sea surface, for instance above a particular source location. For instance, an actual sea surface state can be measured via global positioning system (GPS) or other satellite systems, measured above the source, or measured on a receiver side and reverse calculated, among other measurement methods. As used herein, statistical data associated with the sea surface is information about portions of the sea surface state that is used to estimate a sea surface state. For instance, example statistical data can include one or more of wave height data, wave height variation data, wave depth variation data, wavenumber data, lateral location data, sea surface spectral density data, data associated with time-derivative changes in wave height, wave frequency data, or data associated with other sea conditions occurring at the sea surface. Statistically accurate notional source signatures that are not significantly statistically different than what a measurement would be of the notional source signatures. For instance, in at least one embodiment, notional source signatures determined with consideration of coherent and incoherent portions of a reflection coefficient can be statistically accurate.

In at least one embodiment of the present disclosure, assuming n impulsive source bubbles and a receiver such as a hydrophone, placed one meter (m) away from each bubble, a notional source signature computation using near field data associated with the source can be:

$$p'_i(t) = \frac{h_j(t)}{s_j} - \sum_{i=1}^{n(i \neq j)} \frac{1}{r_{ij}} \cdot p'_i\left(t - \frac{r_{ij}-1}{c}\right) - \sum_{i=1}^{n} \frac{R}{(r_g)_{ij}} \cdot p'_i\left(t - \frac{(r_g)_{ij}-1}{c}\right) \quad (1)$$

where $p'_i(t)$ is the ith notional source pressure signature at a range of 1 m, $r_{ij}$ is the distance from the ith bubble to jth receiver, and c is the speed of sound in water. A bubble is a ball of compressed air surrounded by water that is generated responsive to actuation of a source. The bubble expands and collapses as it rises to the sea surface until air in the bubble escapes at the sea surface. The virtual images or the ghosts of the notional source signatures can be accounted for by the second summation in which the distance $(r_g)_{ij}$ is from the virtual image of the ith bubble to the jth receiver. R is the reflection coefficient, and $s_j$ is the sensitivity of the jth, $h_j$, receiver (volts/bar). In previous approaches to determining notional source signatures, R was assumed to be −1.

In at least one embodiment, Equation (1) can be recast in the frequency domain as:

$$\frac{H_j(\omega)}{S_j} = \sum_{i=1}^{n} P_i' \frac{1}{r_{ij}} \exp\left(-2\pi i \omega \frac{r_{ij}}{c}\right) + \sum_{i=1}^{n} P_i' D_{ij} \quad (2)$$

where $D_{ij}$ is a reflectivity with Dirac function signature or band-limited spike.

In an embodiment in which an actual sea surface state above a source is known, for example through measurements, the part of the wavefield that interacted with the sea surface can be:

$$D_{ij} = \frac{1}{4\pi} \int_{vs} \frac{e^{-ik|\vec{r}'-\vec{r}_j|}}{|\vec{r}'-\vec{r}_j|} \frac{\partial P_i'}{\partial n'} dvs'. \quad (3)$$

In Equation (3), $D_{ij}$ is the sea surface reflectivity recorded at jth receiver as a result of ith bubble. This may also be referred to as a scattered wavefield from the sea surface. The normal derivative of the pressure gradient at the sea surface can be obtained by integral inversion or by applying Kirchhoff approximation.

In at least one embodiment, if the sea surface state above the source is not known, but some statistical data of it can be obtained, Equation (1) can be rewritten as:

$$\frac{H_j(\omega)}{S_j} = \sum_{i=1}^{n} P_i' \left[\frac{1}{r_{ij}} \exp\left(-2\pi i \omega \frac{r_{ij}}{c}\right) + M_{ij}\right] \quad (4)$$

with $$M_{ij} = \int_{vs} R_{coef}(\vec{r}_j, \vec{r}') \frac{1}{|\vec{r}'-\vec{r}_i|} \exp\left[-2\pi i \omega \left(\frac{(\vec{r}'-\vec{r}_i)}{c}\right)\right] dx, \text{ and} \quad (4a)$$

$$R_{coef}(\omega, k_r, z_r | k_s, z) = R_{coef}(\omega, k_r, z | k_s, z) \exp(-ik_z|z_r - z|) \quad (4b)$$

In Equations (3) and (4a), $\vec{r}'$ represents points on the mean sea surface, vs, while $\vec{r}_i$ represents source locations. x is a vector denoting the lateral locations on mean sea level. In Equation (4b), the reflection coefficient $R_{coef}$ is Fourier transformed in spatial receiver and source coordinates (where $k_r$ and $k_s$ are lateral wavenumbers) and extrapolated from the mean sea depth level, z, to the receiver depth $z_r$ level.

In such an example, a coherent portion and an incoherent portion of the reflection coefficient can replace $R_{coef}$ in equation (4a) because $R_{coef}$ and $M_{ij}$ can be matrices. Thus, since the reflection coefficient has coherent and incoherent portions and is frequency- and angle-dependent, the statistically accurate notional source signatures can be computed by taking this data into account. Provided that statistical data such as the root mean square (RMS) of a sea surface wave height variation of the sea surface is available, the coherent and the incoherent portions of the reflection coefficient $R_{coef}$ can be computed. Assuming a sea surface with a height variation that follows a Gaussian distribution with zero mean and an RMS of σ, the reflection coefficient matrix at the sea level in frequency-wavenumber domain can be given by:

$$\langle |\hat{R}_{coef}(\omega, k_r|k_s)|\rangle = \hat{R}_{coh}(\omega, k_r|k_s) + \hat{R}_{incoh}(\omega, k_r|k_s) \quad (5)$$

where $k_r$ and $k_s$ are lateral wavenumber vectors at receiver and bubble locations respectively, $\langle \rangle$ is an expectation operator, and ω is angular frequency. The coherent portion can be given as:

$$\hat{R}_{coh}(\omega, k_r|k_s) = \langle \hat{R}_{coef}(\omega, k_r|k_s)\rangle = \exp\{-2[k_z^s\sigma]^2\}$$
$$\hat{R}_{coef}^{Flat}(\omega, k_r|k_s) \quad (5a)$$

where $k_z^s$ is a vertical wavenumber for a bubble coordinate and $\hat{R}_{coef}^{Flat}$ a finite length flat sea surface reflection coefficient matrix which accounts for finiteness of the sea surface in reality. The incoherent portion can be given as:

$$\hat{R}_{incoh}(\omega, k_r|k_s) \equiv \langle |\hat{R}_{coef}(\omega, k_r|k_s)|\rangle - \langle \hat{R}_{coef}(\omega, k_r|k_s)\rangle = \quad (5b)$$

$$\sqrt{\frac{1}{(2\pi)^2}\left|\frac{k_{dx}k_s - k_{dz}k_z^s}{k_z^r k_{dz}}\right|^2 \int_{-\infty}^{\infty} dx_{fs}}$$
$$[\exp(-k_{dz}^2 \sigma^2(1 - C(x_{fs}))) - \exp\{-[k_{dz}\sigma]^2\}]\exp\{ik_{dx} \cdot x_{fs}\}$$

where $k_{dx}=k_s-k_r$ and $k_{dx}=-(k_z^s+k_z^r)$, $x_{fs}$ is the lateral location on the sea surface. In addition, $C(x_{fs})$ is the sea surface correlation function which can be written as:

$$C(x_{fs})\sigma^2 = \int_{-\infty}^{\infty} dK_{fs} W(K_{fs}) \exp(iK_{fs}x_{fs}) \quad (6)$$

In Equation (6), $K_{fs}$ is the lateral wavenumber vector along the sea surface while $W(K_{fs})$ is the sea surface spectral density which is taken to be from a Pierson-Moskowitz spectrum and can be given as:

$$W(K_{fs}) = [\alpha/(4|K_{fs}|^3)]\exp[-(\beta g^2)/(K_{fs}^2 U^4)] \quad (6a)$$

where $a=8.10*10^{-3}$, $\beta=0.74$, $g=9.81$ m/s$^2$, and U is the wind the speed at a height of 19.5 m. Moreover, $\sigma^2 = \int_{-\infty}^{\infty} dK_{fs} W(K_{fs}) = \alpha U^4/(4\beta g^2)$ implies, assuming a Pierson-Moskowitz sea surface model, that if the RMS is known the spectrum can be computed.

In at least one embodiment, Equation (1) can be transformed into a frequency-wavenumber or frequency-space domain, and the reflection coefficient can be applied based on Equation (5). In such an example, Equation (5) incorporates the coherent and incoherent portions of the reflection coefficient which include the angle and frequency dependency. For a given frequency, the reflection coefficient matrix can be taken from Equations (5a) and (5b).

In at least one embodiment, because Equation (4a) is frequency-space domain, a spatial inverse Fourier transform can be applied to the reflection coefficient obtained from Equation (4b). For a given frequency, the reflection coefficient matrix can be taken from Equation (5a) and (5b). Equations (2) and (4) can be cast in the form of a matrix as follows:

$$H = GP \quad (7)$$

where H and P are both vectors and G can be a square matrix. H, which is also represented as the left-hand terms of Equations (2) and (4) can be a measured pressure wavefield as a contribution of all the sources. P can be the notional source signatures and G, which is also represented as the bracket in Equation (4) and corresponding term in Equation (2) can be a wavefield propagator. For example, the first term of the bracket in Equation (4) can be the free space Green's function, and the second term of the bracket in Equation (4) can be an impulse response of the sea surface. The notional source signature P can be obtained by inverting Equation (7). In at least one embodiment, a far field signature at a desired location can be computed by propagating (e.g., uncertainty propagation, error propagation) and summing the computed notional source signatures at this location.

In at least one embodiment, the notional source signature can be computed in two modes including on an actuation-by-actuation basis and an averaged actuation basis. Actuation-by-actuation basis refers to determining coherent and incoherent portions of the reflection coefficient for each actuation of a source or sources in a source array. Actuation-by-actuation basis can be used in examples when an actual sea surface state is known and in examples in which an actual sea surface state is not known, but statistical data is used to estimate a sea surface state. In an example in which an actual sea surface state is known, coherent and incoherent portions of a reflection coefficient are determined at each actuation. Notional source signatures can be determined based on the coherent and incoherent portions.

In an example in which statistical data is used, for each actuation and given the estimated sea state and therefore the sea surface wave height RMS, the reflection coefficient can be computed based on the sea surface wave height RMS. In at least one embodiment, the RMS of the depth variation relative to the nominal depth over several actuations can be determined. The RMS of the depth variation relative to the nominal depth can be used to determine the reflection coefficient. The reflection coefficient used to determine notional source signatures includes the reflection coefficient's coherent and incoherent portions blended together.

In at least one embodiment, an averaged actuation basis includes computing average near fields by summing all the near fields for a given line, for instance over 1000 actuations. As used herein, a line includes a plurality of source actuations in a same direction, which in this example is over 1000 actuations. The RMS of the depth variation relative to the nominal depth over this line can also be computed. The RMS of the depth variation relative to the nominal depth over this line can be input to the reflection coefficient computation. The reflection coefficient used to determine notional source signatures includes the reflection coefficient's coherent and incoherent portions blended together.

In at least one embodiment of the present disclosure, when an assumption of calculating an incoherent portion of the reflection coefficient cannot be made, the incoherent portion can be disregarded. In such an example, the reflection coefficient can be determined using the coherent portion, and an assumption can be made that if incoherent portions are summed, based on their randomness, that the incoherent portion is statistically negligible.

Figure 3:
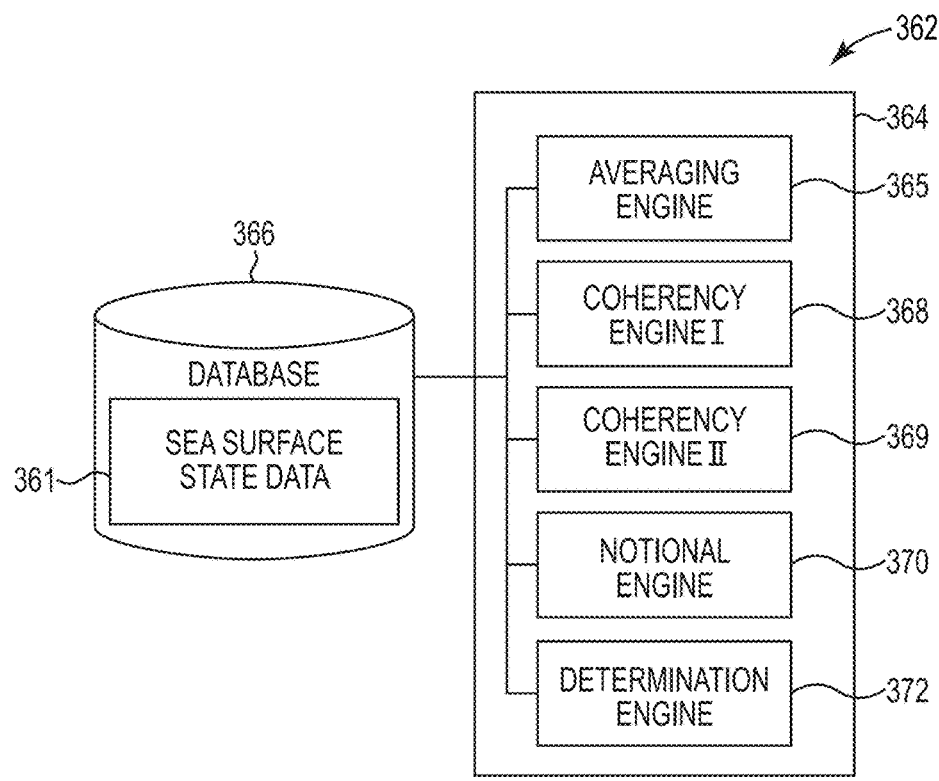
FIG. 3 illustrates a diagram of an exemplary embodiment of a system for far field signature determination.

FIG. 3 illustrates a diagram of a system 362 for far field signature determination. The system 362 can include a database 366, a subsystem 364, and/or a number of engines, such as an averaging engine 365, a first coherency engine 368, a second coherency engine 369, a notional engine 370 and a determination engine 372. The subsystem 364 can be analogous to the controller 119 illustrated in FIG. 1, or be a component included in controller 119, in at least one embodiment. The subsystem 364 and engines can be in communication with the database 366 via a communication link. The database can store sea surface state data 361. The sea surface state data 361 can include data associated with an actual sea surface state, an estimated sea surface state, or sea surface state statistical data. The data can be a result of measurements, estimations, or other marine seismic data collection activities.

The system 362 can include more or fewer engines than illustrated to perform the various functions described herein. The system can represent program instructions and/or hardware of a machine such as the machine 474 referenced in FIG. 4, etc. As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, etc., as well as hard-wired program such as logic. Hard-wired program instructions can be considered as both program instructions and hardware.

The averaging engine 365 can include a combination of hardware and program instructions that is configured to average received near field data associated with each of a plurality of sources within a source array over a line. For instance, near field data associated with each source over a line of 1000 actuations can be summed to determine an average near field.

The first coherency engine 368 can include a combination of hardware and program instructions that is configured to determine a coherent portion of a reflection coefficient of a sea surface associated with the source array. For example, a coherent portion of the reflection coefficient includes a portion of the reflection coefficient that is associated with a specular reflection. In at least one embodiment, the coherent portion can be determined using Equation (5a) for a particular RMS height of the sea surface, and the particular RMS height can be determined from a measurable wind speed. For instance, first coherency engine 368 can include a combination of hardware and program instructions that is configured to determine the coherent portion of the reflection coefficient of a sea surface based on a vertical wavenumber for a bubble coordinate and a finite length flat sea surface plane wave reflection, as illustrated in Equation (5a).

The second coherency engine 369 can include a combination of hardware and program instructions that is configured to determine an incoherent portion of a reflection coefficient of the sea surface associated with the source array. For example, an incoherent portion of the reflection coefficient can include a portion of the reflection coefficient that is associated with a non-specular reflection. In at least one embodiment, the incoherent portion can be determined using Equation (5b) for a particular spectral density function of the sea surface. The spectral density function can be determined using empirical expressions such as the Pierson-Moskowitz spectrum. For example, the second coherency engine can include a combination of hardware and program instructions that is configured to determine the incoherent portion of the reflection coefficient of the sea surface based on a lateral location on the sea surface and a sea surface spectral density, as illustrated in Equation (5b).

The notional engine 370 can include a combination of hardware and program instructions that is configured to determine a notional source signature for each of the plurality of sources using the matrix equation (6) and based on near field measurements and information associated with the sea surface shape. For example, notional engine 370 can include a combination of hardware and program instructions that is configured to determine a notional source signature for each of the plurality of sources based on the averaged near field data, the coherent portion, the incoherent portion, and an RMS of a depth variation relative to a nominal depth over the line. In at least one embodiment, information associated with the sea surface shape can be replaced by statistical parameters of the sea surface, for example the RMS heights or the correlation function. The sea surface reflectivity can be expressed in coherent and incoherent terms.

In at least one embodiment, the notional engine 370 can be configured to disregard the incoherent portion during the determination of the notional source signatures. For example, the RMS of the depth variation relative to the nominal depth over the particular line (e.g., 1000 actuations) can be used to determine the reflection coefficient, and in such an example, the incoherent portion may be disregarded. The coherent portion can be used alone as the reflection coefficient to determination the notional source signatures.

The determination engine 372 can include a combination of hardware and program instructions that is configured to determine a far field signature of the source array based on the notional source signatures. The far field signature can be improved as compared to far field signatures determined using a constant value for a reflection coefficient, resulting in improved source deghosting and designaturing. In at least one embodiment, the far field signature can be determined at a particular location by summing notional source signatures at the particular location or propagating and summing notional source signatures at the particular location.

Figure 4:
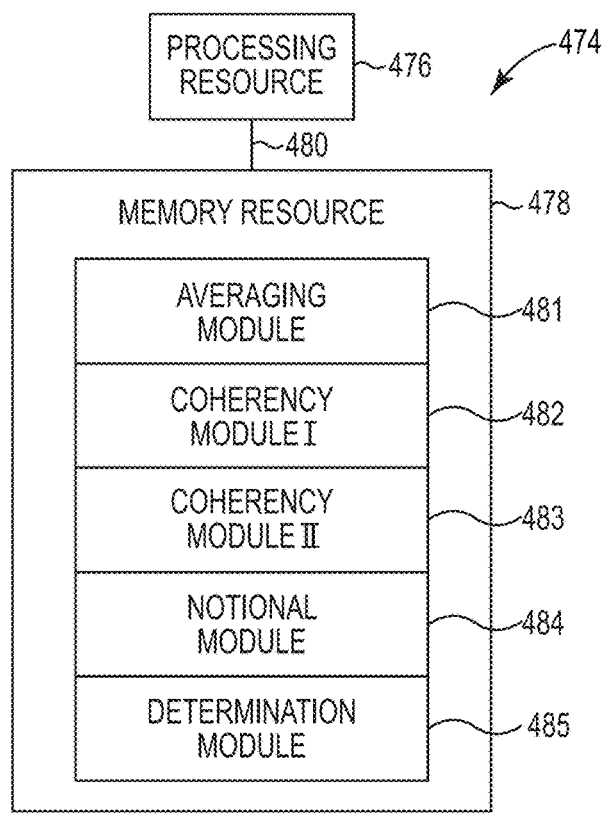
FIG. 4 illustrates a diagram of an exemplary embodiment of a machine for far field signature determination.

FIG. 4 illustrates a diagram of a machine 474 for far field signature determination. The machine 474 can utilize software, hardware, firmware, and/or logic to perform a number of functions. The machine 474 can be a combination of hardware and program instructions configured to perform a number of functions and/or actions. The hardware, for example, can include a number of processing resources 476 and a number of memory resources 478, such as a machine-readable medium or other non-transitory memory resources 478. The memory resources 478 can be internal and/or external to the machine 474, for example, the machine 474 can include internal memory resources and have access to external memory resources. The program instructions, such as machine-readable instructions, can include instructions stored on the machine-readable medium to implement a particular function. The set of machine-readable instructions can be executable by one or more of the processing resources 476. The memory resources 478 can be coupled to the machine 474 in a wired and/or wireless manner. For example, the memory resources 478 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

Memory resources 478 can be non-transitory and can include volatile and/or non-volatile memory. Volatile memory can include memory that depends upon power to store data, such as various types of dynamic random-access memory among others. Non-volatile memory can include memory that does not depend upon power to store data. Examples of non-volatile memory can include solid state media such as flash memory, electrically erasable programmable read-only memory, phase change random-access memory, magnetic memory, optical memory, and/or a solid-state drive, etc., as well as other types of non-transitory machine-readable media.

The processing resources 476 can be coupled to the memory resources 478 via a communication path 480. The communication path 480 can be local or remote to the machine 474. Examples of a local communication path 480 can include an electronic bus internal to a machine, where the memory resources 478 are in communication with the processing resources 476 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 480 can be such that the memory resources 478 are remote from the processing resources 476, such as in a network connection between the memory resources 478 and the processing resources 476. That is, the communication path 480 can be a network connection. Examples of such a network connection can include a local area network, wide area network, personal area network, and the Internet, among others.

As shown in FIG. 4, the machine-readable instructions stored in the memory resource 478 can be segmented into a number of modules 481, 482, 483, 484, and 485 that when executed by the processing resource 476 can perform a number of functions. As used herein a module includes a set of instructions included to perform a particular task or action. The number of modules 481, 482, 483, 484, and 485 can be sub-modules of other modules. For example, the averaging module 482, first coherency module 483, second coherency module 483, and notional module 484 can be sub-modules of the determination module 485. Furthermore, the number of modules 481, 482, 483, 484, and 485 can comprise individual modules separate and distinct from one another. Examples are not limited to the specific modules 481, 482, 483, 484, and 485 illustrated in FIG. 4.

Each of the number of modules 481, 482, 483, 484, and 485 can include program instructions and/or a combination of hardware and program instructions that, when executed by a processing resource 476, can function as a corresponding engine as described with respect to FIG. 3. For example, the averaging module 481 can include program instructions and/or a combination of hardware and program instructions that, when executed by a processing resource 476, can function as the averaging engine 365, the first coherency module 482 can include program instructions and/or a combination of hardware and program instructions that, when executed by a processing resource 476, can function as the first coherency engine 368, the second coherency module 483 can include program instructions and/or a combination of hardware and program instructions that, when executed by a processing resource 476, can function as the second coherency engine 369, the notional module 484 can include program instructions and/or a combination of hardware and program instructions that, when executed by a processing resource 476, can function as the notional engine 370, and the determination module 485 can include program instructions and/or a combination of hardware and program instructions that, when executed by a processing resource 476, can function as the determination engine 372.

In at least one embodiment, the first coherency module 482 and the second coherency module can include instructions executed by processing resource 476 to determine, based on a sea surface state during each of a plurality of actuations of a plurality of sources of a source array, a coherent portion and an incoherent portion of a reflection coefficient of the sea surface. The coherent portion and the incoherent portion can be frequency- and angle-dependent. The sea surfaces state during each of the plurality of actuations, in at least one embodiment can be an estimated sea surface state or an actual sea surface state. In at least one embodiment, the coherent portion and the incoherent portion can be determined based on a sea surface wave height RMS.

In at least one embodiment, notional module 484 can include instructions executable to determine a notional source signature for each of the plurality of sources of the source array based on the coherent portion and the incoherent portion. Determination module 485 can include instructions executed by processing resource 476 to determine a far field signature of the source array at a particular location by propagating and summing the notional source signatures at the particular location.

Figure 5:
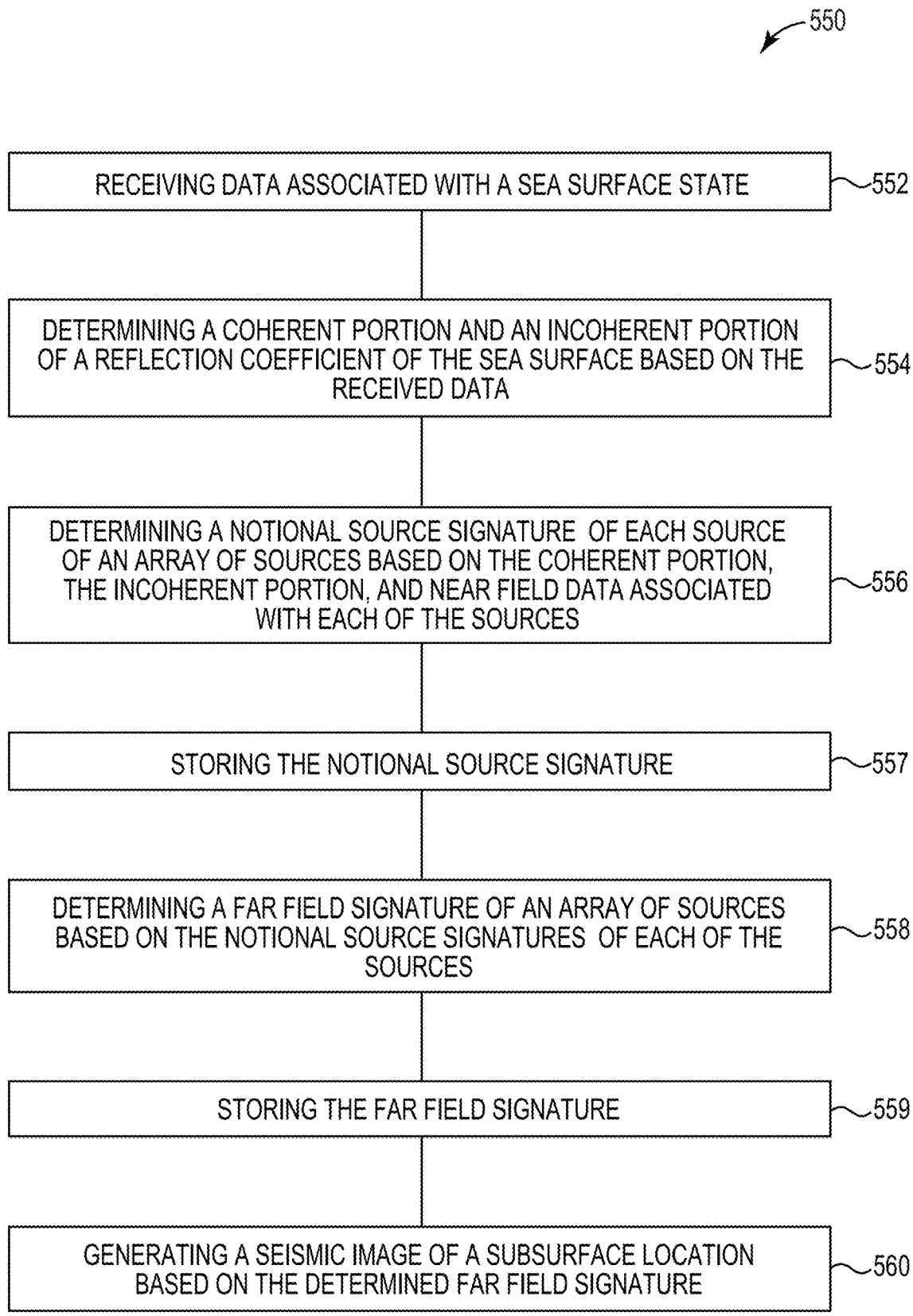
FIG. 5 illustrates an exemplary embodiment of a method flow diagram for far field signature determination.

FIG. 5 illustrates a method flow diagram of a method 550 for far field signature determination. In at least one embodiment, method 550 can be performed by a machine, such as machine 474 illustrated in FIG. 4. At 552, method 550 includes receiving data associated with a sea surface state. The received data can include an actual sea surface state. For instance, if the current state of the sea surface is known (e.g., from a measurement), the received data can include actual sea surface data. If the current state of the sea surface is not known or may only be estimated, the received data can include statistical data associated with the sea surface state. For instance, the statistical data can include an RMS of a wave height variation associated with the sea surface state, among others. In at least one embodiment, the method 550 includes storing the received data. For instance, the received data can be stored in a data store as described with respect to FIG. 3. In at least one embodiment, the received data can be stored onshore or offshore.

At 554, method 550 includes determining a coherent portion and an incoherent portion of a reflection coefficient of the sea surface based on the received data. In at least one embodiment, the coherent portion can include a portion of the reflection coefficient that is associated with a specular reflection, and the incoherent portion can include a portion of the reflection coefficient that is associated with a non-specular reflection.

Method 550, at 556 includes determining a notional source signature of each source of a source array based on the coherent portion, the incoherent portion, and near field data associated with each of the sources. For instance, using a blended version of the coherent and incoherent portions of the reflection coefficient in a notional source signature computation in place of the reflection coefficient can result in more accurate notional source signatures because the sea surface state is considered.

In at least one embodiment, the notional source signature of each source is determined on an actuation-by-actuation basis, such that a reflection coefficient is determined (both coherent and incoherent portions) for each source actuation. The notional source signature of each source can be determined based on an average of the near field data associated with each of the sources in at least one embodiment of the present disclosure. At 557, the method 550 includes storing the notional source signature. For instance, the notional source signature can be stored in a data store as described with respect to FIG. 3. In at least one embodiment, the notional source signature can be stored onshore or offshore.

At 558, method 550 includes determining a far field signature of the source array based on the notional source signatures of each of the sources, for instance by propagating and summing the notional source signatures. The determined far field signature can be improved and more accurate as compared to other far field signatures determinations because the sea surface state is considered. At 559, the method 550 includes storing the far field signature. For instance, the far field signature can be stored in a data store as described with respect to FIG. 3. In at least one embodiment, the far field signature can be stored onshore or offshore. At 560, the method 550 can include generating a seismic image of a subsurface location based on the determined far field signature. For instance, the seismic image can include elements of the subsurface location such as subsurface physical parameters. The seismic image of the subsurface location can be stored in a data store or other storage location, for example.

In at least one embodiment, the method 550 described with respect to FIG. 5 includes a process for generating a seismic image of a subsurface location in which a plurality of sources is activated to produce signals measured by a receiver for use in generating the seismic image, wherein the method 550 is a specific improvement consisting of one or more of elements 552, 553, 554, 556, 558, and 559. In at least one embodiment, the specific improvement can include generating the seismic image based on the determined far field signature, thereby enhancing the image due to more accurate far field signatures resulting from sea surface state considerations.

In accordance with at least one embodiment of the present disclosure, a geophysical data product may be produced or manufactured. Geophysical data may be obtained and stored on a non-transitory, tangible machine-readable medium. The geophysical data product may be produced by processing the geophysical data offshore or onshore either within the United States or in another country. If the geophysical data product is produced offshore or in another country, it may be imported onshore to a facility in the United States. Processing the geophysical data can include performing a full waveform inversion to determine a physical property of a subsurface location. In at least one embodiment, geophysical data is processed to generate a seismic image, and the seismic image on one or more non-transitory computer readable media, thereby creating the geophysical data product. In some instances, once onshore in the United States, geophysical analysis may be performed on the geophysical data product. In some instances, geophysical analysis may be performed on the geophysical data product offshore. For example, geophysical data can be obtained.

As noted, the sea surface shape determines the reflection coefficient. When a source is deployed to a particular depth, the sea surface reflection coefficient in combination with the source depth gives the sea surface reflectivity. Sea surface reflectivity is a measure of the amount of wavefield that is scattered or reflected from the sea surface when it is illuminated by a particular source. Undesirable sea surface effects can be removed by computing ghost function filters. Ghost function filters are defined in frequency-wavenumber domain by spectral division of a measured total pressure wavefield by the up-going pressure wavefield. Total pressure wavefield comprises up-going and down-going pressure wavefields. In at least one embodiment, the sea surface ghost function filter illustrates sea surface reflectivity. FIGS. 6A-6C and FIGS. 7A-7C illustrate an effect of a sea surface reflection coefficient with modeled data and with field data.

Figures 6A, 6B, 6C:
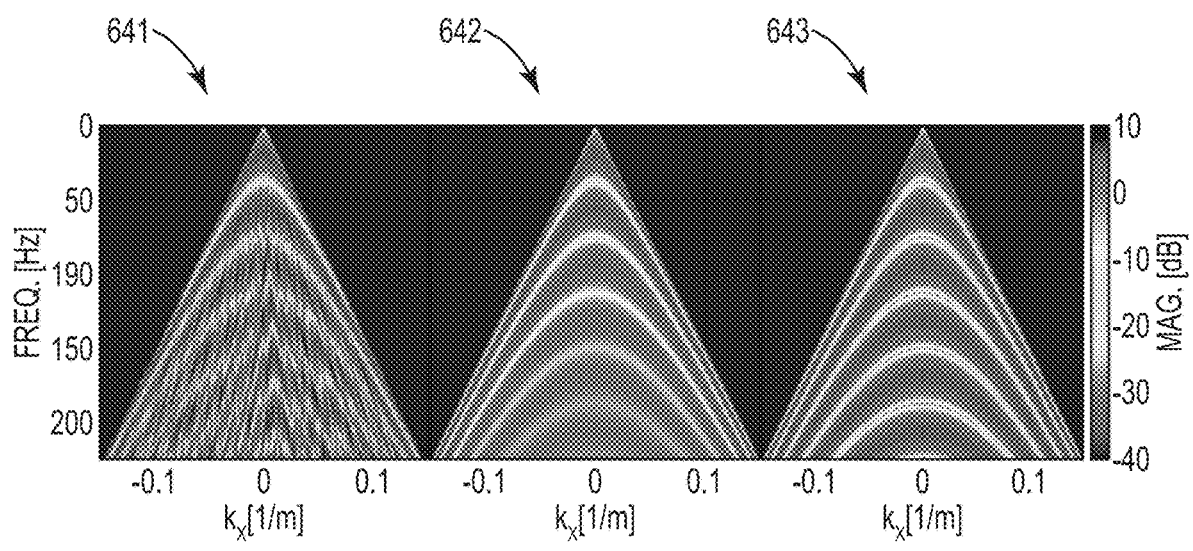
FIGS. 6A-6C illustrate diagrams of frequency-wavenumber amplitude spectra of ghost functions.

FIGS. 6A-6C illustrate diagrams of frequency-wavenumber amplitude spectra of ghost functions. For example, FIGS. 6A-6C illustrate diagrams of frequency-wavenumber amplitude spectra of ghost functions determined from modeled or synthetic rough sea surface data. For instance, FIG. 6A illustrates a true sea surface ghost function filter 641 computed using a true sea surface shape and accounting for coherent and incoherent scattering from the rough sea surface. For instance, a true ghost function filter describes the true effects of the sea surface which is time-variable and contains effects of both coherent and incoherent scattering. FIG. 6B illustrates a statistical sea surface ghost function filter 642 computed using a statistical sea surface wave height parameter that assumes the sea surface shape is Gaussian. As a result, only the coherent scattering is considered. FIG. 6C illustrates a flat sea surface ghost function filter 643 computed using a flat sea surface assumption.

Figures 7A, 7B, 7C:
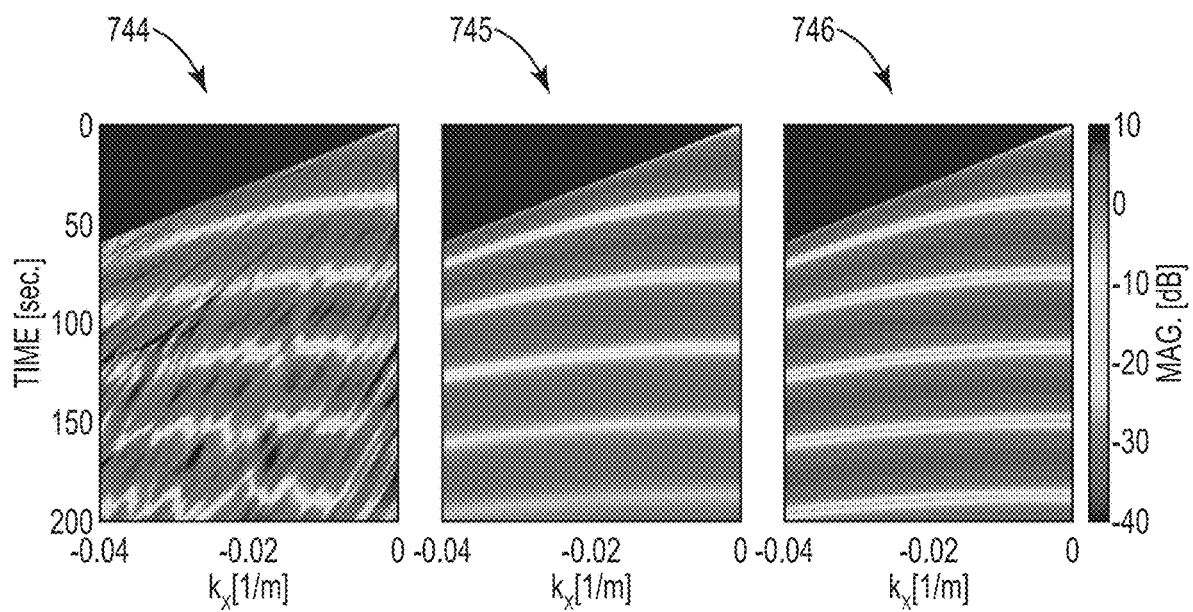
FIGS. 7A-7C illustrate additional diagrams of frequency-wavenumber amplitude spectra of ghost functions.

FIGS. 7A-7C illustrate additional diagrams of frequency-wavenumber amplitude spectra of ghost functions. For example, FIGS. 7A, 7B, and 7C correspond to FIGS. 6A, 6B, and 6C respectively, except the diagrams illustrate frequency-wavenumber amplitude spectra of ghost functions from field data of marginal weather as opposed to synthetic data. For instance, FIG. 7A illustrates a true sea surface ghost function filter 744 computed using a true sea surface shape and accounting for coherent and incoherent scattering from the rough sea surface. FIG. 7B illustrates a statistical sea surface ghost function filter 745 computed using a statistical sea surface wave height parameter that assumes the sea surface shape is Gaussian. As a result, only the coherent scattering is considered. FIG. 7C illustrates a flat sea surface ghost function filter 746 computed using a flat sea surface assumption.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving data associated with a sea surface state;
   determining a coherent portion and an incoherent portion of a reflection coefficient of the sea surface based on the received data;
   determining a notional source signature of each source of a source array based on the coherent portion, the incoherent portion, and near field data associated with each of the sources;
   storing the notional source signature;
   determining a far field signature of the source array based on the notional source signatures of each of the sources;
   storing the far field signature; and
   generating a seismic image of a subsurface location based on the determined far field signature.

2. The method of claim 1, further comprising determining the notional source signature of each source on an actuation-by-actuation basis.

3. The method of claim 1, further comprising determining the notional source signature of each source based on an average of the near field data associated with each of the sources.

4. The method of claim 1, wherein receiving data associated with the sea surface state comprises receiving an actual sea surface state.

5. The method of claim 1, wherein receiving data associated with the sea surface state comprises receiving statistical data associated with the sea surface state.

6. The method of claim 1, wherein receiving data associated with a sea surface state comprises receiving a root mean square (RMS) of a wave height variation associated with the sea surface state.

7. The method of claim 1, wherein determining the coherent portion comprises determining a portion of the reflection coefficient that is associated with a specular reflection.

8. The method of claim 1, wherein determining the incoherent portion comprises determining a portion of the reflection coefficient that is associated with a non-specular reflection.

9. A non-transitory machine-readable medium storing instructions executable by a processing resource to:
   determine, based on a sea surface state during each of a plurality of actuations of a plurality of sources of a source array, a coherent portion and an incoherent portion of a reflection coefficient of the sea surface;
   determine a notional source signature for each of the plurality of sources of the source array based on the coherent portion and the incoherent portion; and
   determine a far field signature of the source array at a particular location by propagating and summing the notional source signatures at the particular location.

10. The medium of claim 9, wherein the sea surface state during each of the plurality of actuations is an estimated sea surface state.

11. The medium of claim 10, wherein the sea surface state during each of the plurality of actuations is an actual sea surface state.

12. The medium of claim 10, wherein the instructions are further executable to determine the coherent portion and the incoherent portion based on a sea surface wave height root mean square.

13. The medium of claim 10, wherein the coherent portion and the incoherent portion are frequency and angle dependent.

14. A system, comprising:
   an averaging engine to average received near field data associated with each of a plurality of sources within a source array over a line;
   a first coherency engine to determine a coherent portion of a reflection coefficient of a sea surface associated with the source array;
   a second coherency engine to determine an incoherent portion of a reflection coefficient of the sea surface associated with the source array;
   a notional engine to determine a notional source signature for each of the plurality of sources based on the averaged near field data, the coherent portion, the incoherent portion, and a root mean square (RMS) of a depth variation relative to a nominal depth over the line;
   a determination engine to determine a far field signature of the source array based on the notional source signatures.

15. The system of claim 14, the determination engine to determine the far field signature at a particular location by summing notional source signatures at the particular location.

16. The system of claim 14, further comprising the first coherency engine to determine the coherent portion of the reflection coefficient of a sea surface based on a vertical wavenumber for a bubble coordinate and a finite length flat sea surface plane wave reflection.

17. The system of claim 14, further comprising the second coherency engine to determine the incoherent portion of the reflection coefficient of the sea surface based on a lateral location on the sea surface and a sea surface spectral density.

18. The system of claim 14, further comprising the notional engine to disregard the incoherent portion during the notional source signatures determinations.

19. A method of manufacturing a geophysical data product, comprising:
receiving data associated with a sea surface state;
determining a coherent portion and an incoherent portion of a reflection coefficient of the sea surface based on the received data;
determining a notional source signature of each source of a source array based on the coherent portion, the incoherent portion, and near field data associated with each of the sources; and
determining a far field signature of the source array based on the notional source signatures of each of the sources;
generating a seismic image, or a representation thereof, based on the determined far field signature; and
recording the seismic image or the representation thereof on one or more non-transitory machine-readable media, thereby completing the manufacture of the geophysical data product.

20. The method of claim 19, wherein processing the geophysical data comprises processing the geophysical data offshore or onshore.

21. A method, comprising:
determining a plurality of notional source signatures, each corresponding to a respective one of a plurality of sources;
storing the plurality of notional source signatures;
determining a far field signature for the plurality of sources based at least in part on the determined plurality of notional source signatures; and
storing the far field signature;
wherein determining the plurality of notional source signatures comprises determining first and second quantities, the first quantity representing a contribution of a source at one or more locations, and the second quantity representing a contribution of a ghost of the source at the one or more locations; and
wherein determining the second quantity comprises using a sea surface reflection coefficient that is not a constant.

22. The method of claim 21, further comprising:
determining the sea surface reflection coefficient such that it includes coherent and noncoherent portions, the coherent portion corresponding to sea surface reflections that are specular, and the noncoherent portion corresponding to sea surface reflections that are non-specular.

23. The method of claim 22, wherein:
each of the coherent and noncoherent portions is angle and frequency dependent.

24. The method of claim 22, wherein:
determining the plurality of notional source signatures is based at least in part on a matrix representation of the sea surface reflection coefficient.

25. The method of claim 22, wherein:
determining the sea surface reflection coefficient is based at least in part on information derived from one or more measurements of sea surface conditions.

26. The method of claim 25, wherein:
the information derived from one or more measurements of sea surface conditions comprises a root mean square ("RMS") of sea surface wave height variation.

27. The method of claim 21, wherein:
determining the plurality of notional source signatures comprises determining the sea surface reflection coefficient separately for each actuation of the plurality of sources over a survey line.

28. The method of claim 21, wherein:
determining the plurality of notional source signatures comprises determining the sea surface reflection coefficient based at least in part on one or more average values corresponding to multiple actuations of the plurality of sources over a survey line.

* * * * *